United States Patent
B et al.

(10) Patent No.: US 12,033,517 B2
(45) Date of Patent: Jul. 9, 2024

(54) SYSTEMS AND METHODS FOR DISPLAYING OFF-BOARD RECHARGE STATION INFORMATION FOR AN URBAN AIR MOBILITY (UAM) VEHICLE

(71) Applicant: HONEYWELL INTERNATIONAL INC., Morris Plains, NJ (US)

(72) Inventors: Jayasenthilnathan B, Phoenix, AZ (US); Saravanakumar Gurusamy, Bangalore (IN); Madhava Gadicherla, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 802 days.

(21) Appl. No.: 16/941,246

(22) Filed: Jul. 28, 2020

(65) Prior Publication Data
US 2021/0383704 A1 Dec. 9, 2021

(30) Foreign Application Priority Data
Jun. 9, 2020 (IN) .............................. 202011024120

(51) Int. Cl.
*B64C 39/02* (2023.01)
*G08G 5/00* (2006.01)
*H04W 4/40* (2018.01)
*B64U 50/19* (2023.01)

(52) U.S. Cl.
CPC ......... *G08G 5/0021* (2013.01); *B64C 39/024* (2013.01); *G08G 5/0039* (2013.01); *G08G 5/0069* (2013.01); *H04W 4/40* (2018.02); *B64U 50/19* (2023.01)

(58) Field of Classification Search
CPC .. G08G 5/0021; G08G 5/0039; G08G 5/0069; H04W 4/40; B64C 39/024; B64C 2201/042; B64U 50/19
USPC .............................................................. 701/3
See application file for complete search history.

(56) References Cited

U.S. PATENT DOCUMENTS

| | | | |
|---|---|---|---|
| 8,825,402 B2 | 9/2014 | Hayashi | |
| 9,387,928 B1 * | 7/2016 | Gentry | ................... B60L 53/00 |
| 9,454,157 B1 | 9/2016 | Hafeez et al. | |
| 9,561,860 B2 | 2/2017 | Knapp et al. | |
| 10,150,524 B2 | 12/2018 | Evans | |
| 10,593,215 B2 | 3/2020 | Villa | |
| 2016/0363456 A1 | 12/2016 | Pujos et al. | |

(Continued)

*Primary Examiner* — Manglesh M Patel
(74) *Attorney, Agent, or Firm* — Lorenz & Kopf LLP

(57) ABSTRACT

Methods and systems for providing off-board recharge station information for an urban air mobility (UAM) vehicle flying on an intended trip. The method includes displaying a map showing the UAM vehicle at a current location, the intended trip, and an endurance line that represents an extent of the available UAM charge. The method retrieves recharge station information including a station name, location, number of recharge ports at the station, and a compatibility type for each of the recharge ports. The method identifies recharge stations that are compatible with the UAM vehicle and can be reached from the intended trip with the UAM available charge, and also updates information associated with the identified recharge stations responsive to a received real-time status update. The method visually depicts the identified recharge stations and visually distinguishes an identified recharge station having a shortest path deviation from the intended trip.

19 Claims, 6 Drawing Sheets

(56) References Cited

U.S. PATENT DOCUMENTS

| | | |
|---|---|---|
| 2017/0069214 A1* | 3/2017 | Dupray ................ G08G 5/0008 |
| 2017/0217319 A1 | 8/2017 | Araki |
| 2017/0307392 A1 | 10/2017 | Kitajima et al. |
| 2018/0072170 A1* | 3/2018 | Evans ..................... B60L 53/60 |
| 2018/0108260 A1 | 4/2018 | Kuhara |
| 2019/0265057 A1 | 8/2019 | Baglino et al. |
| 2019/0299802 A1* | 10/2019 | Neubecker .............. B60L 53/65 |
| 2020/0105149 A1* | 4/2020 | Mahkonen ........... G08G 5/0034 |
| 2020/0105159 A1 | 4/2020 | Mahkonen et al. |

* cited by examiner

SYSTEMS AND METHODS FOR DISPLAYING OFF-BOARD RECHARGE STATION INFORMATION FOR AN URBAN AIR MOBILITY (UAM) VEHICLE

CROSS REFERENCE TO RELATED APPLICATION

This application claims priority to Indian Provisional Patent Application No. 202011024120, filed Jun. 9, 2020, the entire content of which is incorporated by reference herein.

TECHNICAL FIELD

The following disclosure relates generally to urban air mobility (UAM) vehicles and, more particularly, to systems and methods for displaying off-board recharge station information for UAM vehicle.

BACKGROUND

The emerging market of UAM (Urban Air Mobility) includes UAM vehicles such as e-VTOL (electric Vertical Take-off and Landing) vehicles. These vehicles each have their own battery capacity, range, and charging requirements.

UAM vehicle operations are different from traditional aircraft or helicopter operations in a variety of significant ways, impacting their recharge requirements. First, they may be traveling from point to point, with no guarantee that they can recharge at their origin and/or destination points. Next, as a function of a UAM vehicle-specific range, the UAM vehicle may have to deviate from its intended trip multiple times to recharge. Therefore, a technical problem is presented in locating potential recharge stations and determining which ones to utilize while achieving an overall goal of adhering as closely as possible to an intended path to minimize a time impact from the recharge deviations.

Accordingly, technologically improved systems and methods that provide off-board recharge station information for an urban air mobility (UAM) vehicle are desirable. Furthermore, other desirable features and characteristics of the present invention will be apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Provided is a system for providing on a display device off-board recharge station information for an urban air mobility (UAM) vehicle. The system includes: a data storage of recharge station information; a controller having an on-board processor operationally coupled to the data storage and configured by programming instructions on non-transient computer readable media to: determine that an available UAM charge is not sufficient to complete an intended trip; command the display device to display a map showing the UAM at a current location, the intended trip, and an endurance line that represents an extent of the available UAM charge; identify recharge stations that are compatible with the UAM, and can be reached from the intended trip with the UAM available charge; update information associated with the identified recharge stations responsive to a real-time status update for at least one of the identified recharge stations; and command the display device to display the identified recharge stations and to visually depict an identified recharge station having a shortest path deviation from the intended trip, as determined based on the updated identified recharge stations.

Also provided is a method for providing on a display device off-board recharge station information for an urban air mobility (UAM) vehicle. The method includes: determining, by a controller on-board the UAM vehicle, that an available UAM charge is not sufficient to complete an intended trip; displaying a map showing the UAM vehicle at a current location, the intended trip, and an endurance line that represents an extent of the available UAM charge; retrieving, by the controller, recharge station information including the station name, a station location, a number of recharge ports at the station, and a compatibility type for each recharge port; identifying, by the controller, recharge stations that are compatible with the UAM vehicle, and can be reached from the intended trip with the UAM available charge; updating, by the controller, information associated with the identified recharge stations responsive to a received real-time status update for at least one of the identified recharge stations; filtering the identified recharge stations based on a predefined distance; and commanding the display device to visually depict on the map the filtered identified recharge stations, and visually distinguish an identified recharge station having a shortest path deviation from the intended trip, as determined based on the updated identified recharge stations.

Another method for providing on a display device off-board recharge station information for an urban air mobility (UAM) vehicle flying on a flight plan is provided. The method includes: determining, by a controller on-board the UAM vehicle, that an available UAM charge is not sufficient to complete an intended trip; displaying a map showing the UAM vehicle at a current location, the intended trip, and an endurance line that represents an extent of the available UAM charge; retrieving, by the controller, recharge station information including a station name, a station location, a number of recharge ports at the station, and a compatibility type for each of the number of recharge ports; identifying, by the controller, recharge stations that are compatible with the UAM vehicle, and can be reached from the intended trip with the UAM available charge; updating, by the controller, information associated with the identified recharge stations responsive to a received real-time status update for at least one of the identified recharge stations; filtering the identified recharge stations based on a predefined distance; and commanding the display device to visually depict the filtered identified recharge stations, an identified recharge station having a shortest path deviation from the intended trip, and the shortest path deviation, as determined based on the updated identified recharge stations.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. The term "exemplary," as appearing throughout this document, is synonymous with the term "example" and is utilized repeatedly below to emphasize that the description appearing in the following section merely provides multiple non-limiting examples of the invention and should not be construed to restrict the scope of the invention, as set-out in the Claims, in any respect. As further appearing herein, the term "pilot" encompasses all users of the below-described aircraft system.

As mentioned, there are several technical problems unique to UAM vehicle operations as contrasted with traditional aircraft or helicopter operations. A focus herein is the UAM vehicle-specific recharge requirement. This technical problem encompasses recharge issues such as, by traveling from point to point (i.e., not from an airport to an airport), there is no guarantee that they can recharge at their origin and/or destination points. Additionally, as a function of a UAM vehicle-specific range, the UAM vehicle may have to deviate from its intended trip multiple times to recharge. Therefore, a multi-variable technical problem is presented in locating potential recharge stations and determining which ones to utilize while adhering as closely as possible to an intended path to minimize a time impact from the recharge deviations.

The present disclosure provides a solution to the above problems in the form of systems and methods for displaying off-board recharge station information for a UAM vehicle.

Figure 1:
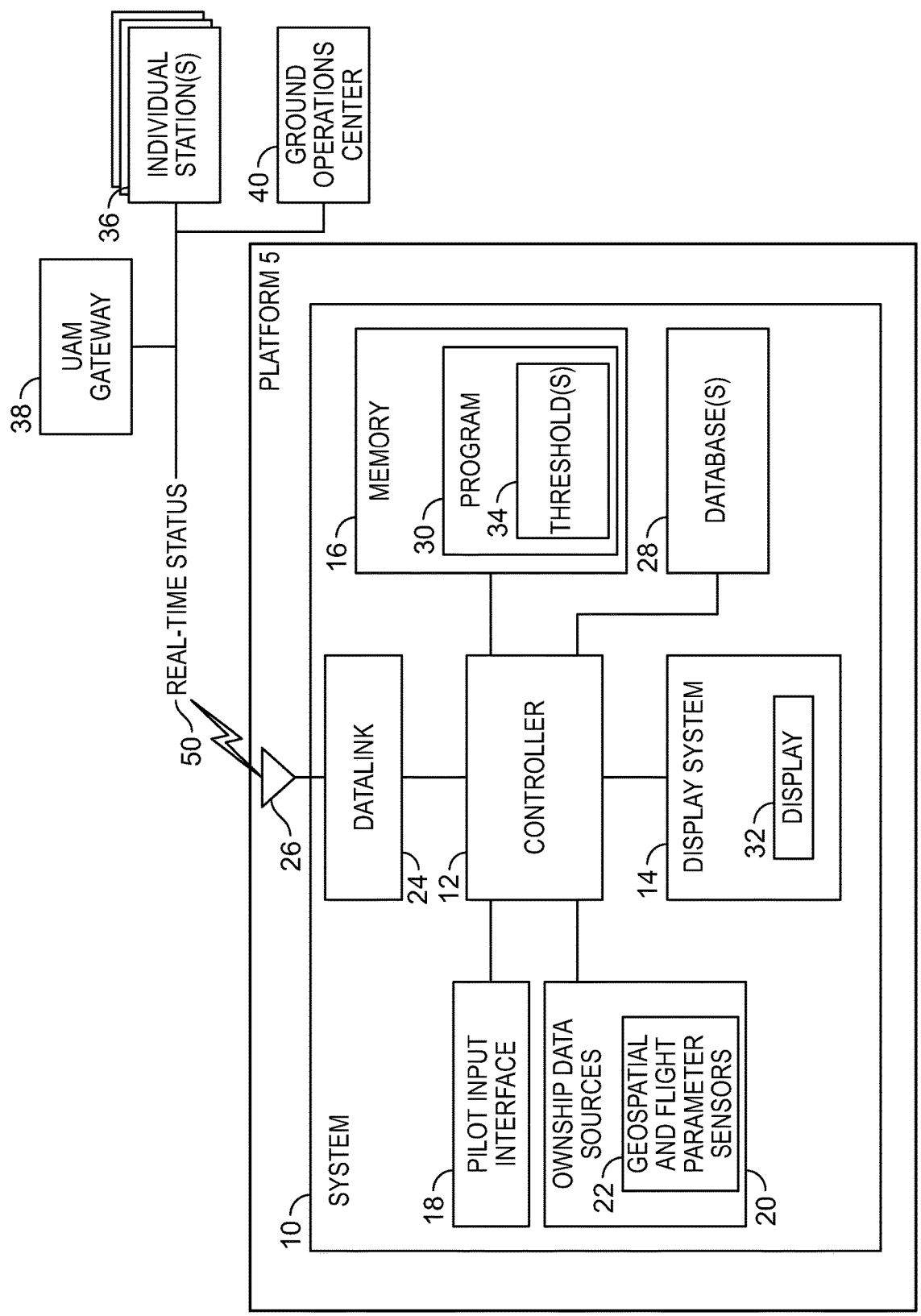
FIG. 1 is a block diagram of a system for displaying off-board recharge station information for UAM vehicle, as illustrated in accordance with an exemplary embodiment of the present disclosure.

FIG. 1 is a block diagram of a system 10 for displaying off-board recharge station information for UAM vehicle, as illustrated in accordance with an exemplary and non-limiting embodiment of the present disclosure. The system 10 for displaying off-board recharge station information for UAM vehicle may be utilized onboard a mobile platform 5 to provide enhanced recharge station awareness, as described herein. In various embodiments, the mobile platform is urban air mobility (UAM) vehicle 5, which carries or is equipped with the system 10 for displaying off-board recharge station information. As schematically depicted in FIG. 1, system 10 for displaying off-board recharge station information for a UAM vehicle (shortened herein to "system" 10) includes the following components or subsystems, each of which may assume the form of a single device or multiple interconnected devices: a controller 12 operationally coupled to: at least one display device 14; computer-readable storage media or memory 16; an optional input interface 18, and ownship data sources 20 including, for example, an array of flight system status and geospatial sensors 22. The system 10 may be separate from or integrated within: a flight management system (FMS) and/or a flight control system (FCS). The system 10 may also contain a datalink subsystem 24 including an antenna 26, which may wirelessly transmit data to and receive real-time status data (50) from various sources external to system 10, such as, each of: individual recharge stations 36, a UAM gateway 38, and/or a ground operations center 40.

Although schematically illustrated in FIG. 1 as a single unit, the individual elements and components of the system 10 can be implemented in a distributed manner utilizing any practical number of physically distinct and operatively interconnected pieces of hardware or equipment. When the system 10 is utilized as described herein, the various components of the system 10 will typically all be located onboard the UAM vehicle 5.

The term "controller," as appearing herein, broadly encompasses those components utilized to carry-out or otherwise support the processing functionalities of the system 10 for displaying off-board recharge station information for UAM vehicle. Accordingly, controller 12 can encompass or may be associated with a programmable logic array, application specific integrated circuit or other similar firmware, as well as any number of individual processors, flight control computers, navigational equipment pieces, computer-readable memories (including or in addition to memory 16), power supplies, storage devices, interface cards, and other standardized components. In various embodiments, controller 12 embodies one or more processors operationally coupled to data storage having stored therein at least one firmware or software program (generally, computer-readable instructions that embody an algorithm) for carrying-out the various process tasks, calculations, and control/display functions described herein. During operation, the controller 12 may be programmed with and execute the at least one firmware or software program, for example, program 30, that embodies an algorithm for receiving, processing, and displaying, off-board recharge station information for UAM vehicle 5, to thereby perform the various process steps, tasks, calculations, and control/display functions described herein.

Controller 12 may exchange data, including receiving real-time status data 50, with one or more external sources to support operation of the system 10 in embodiments. In this case, bidirectional wireless data exchange may occur over a communications network, such as a public or private network implemented in accordance with Transmission Control Protocol/Internet Protocol architectures or other conventional protocol standards. Encryption and mutual authentication techniques may be applied, as appropriate, to ensure data security.

Memory 16 can encompass any number and type of storage media suitable for storing computer-readable code or instructions, such as the aforementioned software program 30, as well as other data generally supporting the operation of the system 10. Memory 16 may also store one or more threshold 34 values, for use by an algorithm embodied in software program 30.

The database(s) 28 are another form of storage media, which may be integrated into memory 16 or separate from it. Database(s) 28 may store recharge station information, such as, for each recharge station 36 of a plurality of recharge stations 36, the respective station name 402, a station location, a number (N) of recharge ports at the station, and a compatibility type for each of the N recharge ports. As used herein, the compatibility type of a recharge port includes the geometric size and shape of the port, the pinout/footprint, and any current/voltage/power specifications associated with the port. This recharge station information may be uploaded into the database 28 at an initialization step and then periodically updated, as directed by either a program 30 update or by an externally triggered update.

In various embodiments, UAM vehicle-specific parameters and information for UAM vehicle 5 may be stored in the memory 16 or in the one or more databases 28 and referenced by the program 30. The UAM vehicle-specific information includes the specified type of recharge port needed by the UAM vehicle 5, a maximum charge capacity, a UAM vehicle weight, average range, a maximum ground speed and a maximum vertical acceleration and deceleration.

In various embodiments, Database(s) 28 may also store two- or three-dimensional map data including geographical (terrain), buildings, bridges, and other structures, street maps, and navigational databases, which may be updated on a periodic or iterative basis to ensure data timeliness. This map data may be uploaded into the database 28 at an initialization step and then periodically updated, as directed by either a program 30 update or by an externally triggered update.

Flight parameter sensors and geospatial sensors 22 supply various types of data or measurements to controller 12 during UAM vehicle flight. In various embodiments, the geospatial sensors 22 supply, without limitation, one or more of: remaining battery charge, inertial reference system measurements providing a location (FIG. 2, 202), Flight Path Angle (FPA) measurements, airspeed data, groundspeed data (including groundspeed direction), vertical speed data, vertical acceleration data, altitude data (FIG. 2, 202), attitude data including pitch data and roll measurements, yaw data, heading (FIG. 2, 302) information, sensed atmospheric conditions data (including wind speed and direction data), flight path data, flight track data, radar altitude data, and geometric altitude data.

In certain embodiments of system 10, the controller 12 and the other components of the system 10 may be included within or cooperate with any number and type of systems commonly deployed onboard a UAM vehicle including, for example, an FMS, an Attitude Heading Reference System (AHRS), an Instrument Landing System (ILS), and/or an Inertial Reference System (IRS), to list but a few examples.

With continued reference to FIG. 1, display device 14 can include any number and type of image generating devices on which one or more avionic displays 32 may be produced. When the system 10 is utilized for a manned UAM vehicle, display device 14 may be affixed to the static structure of the UAM vehicle cockpit as, for example, a Head Down Display (HDD) or Head Up Display (HUD) unit. Alternatively, display device 14 may assume the form of a movable display device (e.g., a pilot-worn display device) or a portable display device, such as an Electronic Flight Bag (EFB), a laptop, or a tablet computer carried into the UAM vehicle cockpit by a pilot.

At least one avionic display 32 is generated on display device 14 during operation of the system 10; the term "avionic display" defined as synonymous with the term "aircraft-related display" and "cockpit display" and encompasses displays generated in textual, graphical, cartographical, and other formats. The system 10 can generate various types of lateral and vertical avionic displays 32 on which map views and symbology, text annunciations, and other graphics pertaining to flight planning are presented for a pilot to view. The display device 14 is configured to continuously render at least a lateral display 32 showing the UAM vehicle 5 at its current location within the map data. The avionic display 32 generated and controlled by the system 10 can include graphical user interface (GUI) objects and alphanumerical input displays of the type commonly presented on the screens of MCDUs, as well as Control Display Units (CDUs) generally. Specifically, embodiments of avionic displays 32 include one or more two dimensional (2D) avionic displays, such as a horizontal (i.e., lateral) navigation display or vertical navigation display; and/or on one or more three dimensional (3D) avionic displays, such as a Primary Flight Display (PFD) or an exocentric 3D avionic display.

In various embodiments, a human-machine interface, such as the above described touch screen display, is implemented as an integration of the pilot input interface 18 and a display device 14. Via various display and graphics systems processes, the controller 12 may command and control the touch screen display generating a variety of graphical user interface (GUI) objects or elements described herein, including, for example, buttons, sliders, and the like, which are used to prompt a user to interact with the human-machine interface to provide user input, and to activate respective functions and provide user feedback, responsive to received user input at the GUI element.

Figure 2:
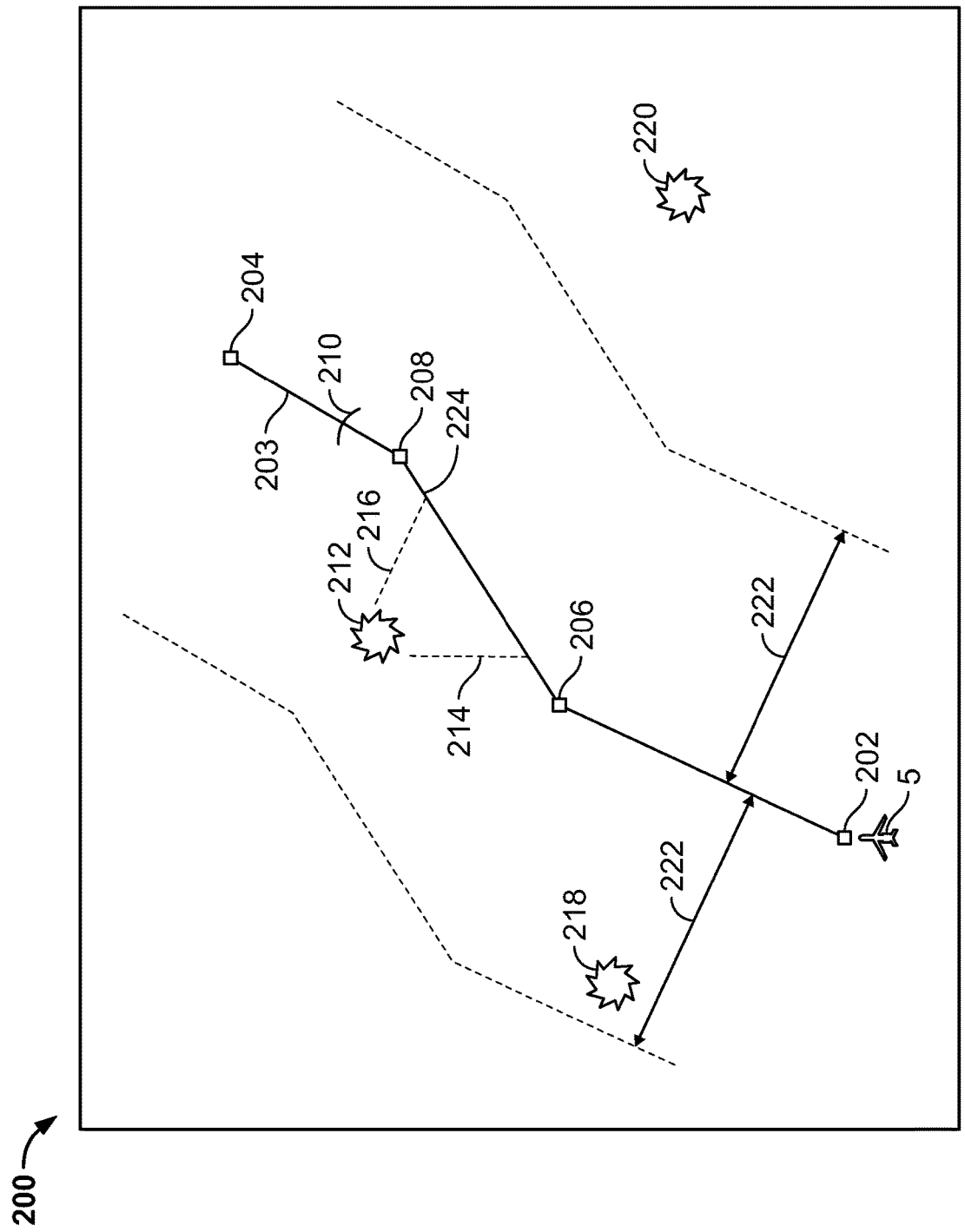
FIGS. 2-3 are map views (also referred to as a lateral or horizontal displays), as may be generated and displayed on the display device of a UAM vehicle, in accordance with an exemplary embodiment of the present disclosure.
Figure 3:
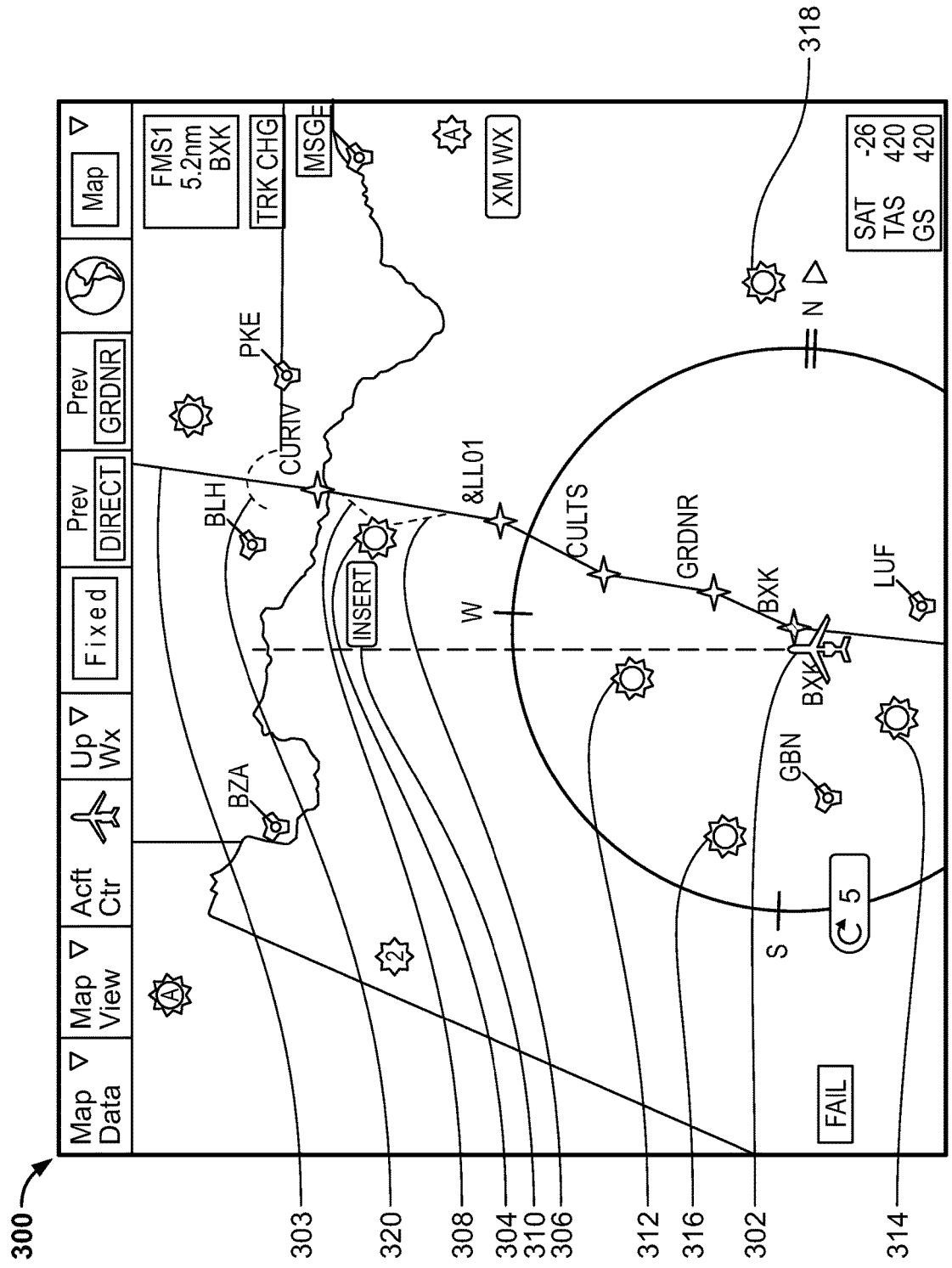

Turning now to FIGS. 2-3, and with continued reference to FIG. 1, the presentation of lateral images and interactive tabular views generated by system 10, in accordance with various embodiments, is described in detail. The controller 12 may command the display device 14 to display a map showing the UAM vehicle at a current location, the intended trip, and an endurance line that represents an extent of the available UAM charge.

In FIG. 2, the UAM vehicle 5 is depicted on a map display 200 at current location 202, on an intended trip 203. The intended trip 203 passes through waypoint 206 and waypoint 208 en route to destination 204. Recharge stations 212, 218 and 220 are indicated with a pre-selected symbol rendered at their respective locations. In an embodiment, the pre-selected symbol used for a recharge station is circular with a jagged edge on the external circumference, but other symbols may be employed in other embodiments.

The controller 12 processes various geospatial and flight parameter sensor 22 data with UAM vehicle-specific data and the intended trip 203 information to determine an available charge for the UAM vehicle 5, and whether the UAM vehicle 5 can complete the intended trip 203 with the available UAM charge. When the controller 12 determines that the available UAM charge is not sufficient to complete the intended trip 203, the controller 12 estimates a distance that could be traveled by the UAM vehicle 5 before the available charge expires, and renders an endurance line 210 intersecting the intended trip 203 at an estimated location on the intended trip 203 that the available charge is estimated to expire. The depicted endurance line 210 is slightly curved in FIG. 2 and FIG. 3, and may be rendered in a bright color, but in other embodiments, the endurance line 210 may be depicted differently.

The controller 12 receives real-time status data 50 from the nearby recharge stations 36. Real-time status data 50 can reflect a status change at one or more of the nearby recharge stations 36. Non-limiting examples of real-time status data include a port being closed for repair, an increase or decrease in queue, a change in average wait times, a change in a number of available ports, and the like. The received real-time status data 50 can be received directly from an individual recharge station 36, or can be received from a UAM gateway 38, or can be received from a ground operations center 40. The controller 12 processes the received real-time status data 50 with retrieved recharge station information from database 28 to identify recharge stations 36 that are (i) compatible with the UAM vehicle 5, and (ii) can be reached from the intended trip 203 with the UAM available charge. The controller 12 creates and stores an up-to-date list of the identified recharge stations 36 and updates this list responsive to received real-time status data 50.

Additionally, in various embodiments, a predefined distance 222 may be utilized by the controller 12 to further filter the identified recharge stations that could be used by the UAM vehicle 5. The predefined distance 222 extends at least laterally on each side of the intended trip 203 and may be employed to limit how far off the intended trip 203 the pilot may be willing to (or permitted to) travel to recharge; therefore, this is different than the estimated distance that could be achieved before the available charge expires. In various embodiments, the predefined distance 222 is preprogrammed and stored as a threshold 34 in memory 16. In other embodiments, the predefined distance 222 is entered in the course of UAM operation by a user via the pilot input interface 18, or by an air traffic control authority. On FIG. 2, the predefined distance 222 is depicted on the map display 200 to assist with visualizing the concept; however, in some embodiments (such as is depicted in FIG. 3), the predefined distance 222 is not depicted.

The controller 12 uses the above determinations to identify a recharge station 212 having a shortest path deviation (214 and 216) distance from the intended trip 203, and commands the display device 14 to visually depict on the map the filtered identified recharge stations, and to visually distinguish the identified recharge station 212 having the shortest path deviation from the intended trip 203, as determined based on the updated identified recharge stations. In various embodiments, the controller 12 further visually depicts the shortest path itself, as outbound path 214 and return path 216. Note that the shortest path deviation distance is determined by the controller 12 to be a summation of an outbound path 214 and a return path 216, which may not have the same length, the shortest path deviation is not simply an out-an-back route, and that the return path 216 places the UAM vehicle 5 back on the intended trip at a recapture point 224 that is closer to a trip destination and different from a departure point from which the outbound path 214 is started. In this manner, (not just showing an out-and-back distance to the recharge station 212 from the intended trip 203) the controller 12 is providing an enhanced human-machine interface by calculating and displaying a shortest path that is compatible with the direction of the intended trip 203, and therefore likely to have the most minimal time impact on the intended trip 203.

FIG. 3 shows many of the same concepts described in connection with FIG. 2, but in FIG. 3, the intended trip is a flight plan 303. The UAM vehicle 302 is shown on the flight plan 303. A recharge station 304 has been determined to have the shortest path and is visually distinguished with outbound path 306 and return path 308. Endurance line 320 is depicted on the flight plan 303. Recharge stations 312, 314, 316, and 318 are rendered. As described above, in various embodiments, the controller 12 may indicate the position of the rendered recharge stations with respect to the predefined distance. In various examples, the controller 12 uses a visualization technique, such as color coding, highlighting, or darkening a border, on the symbols used for recharge stations to depict their position with respect to the predefined distance. For example, as shown in FIG. 3, the controller 12 may command the display device 14 to present identified recharge stations on the map display 300 and, as a result of filtering with the predefined distance, color code recharge stations (304, 312, and 314) within the predefined distance from the intended trip a first color, such as green; and, color code recharge stations (316 and 318) beyond the predefined distance from the intended trip a second color that is distinguishable from the first color, such as red.

Various embodiments additionally distinguish the shortest path recharge station by rendering a text box 310 alongside the shortest path recharge station 304. The text box 310 may recite a user-selectable prompt, such as "insert," or "add to flight plan." When the user selects the insert or add to flight plan, the controller 12 may automatically adjust the flight plan to reflect the deviation to the charging station.

Figure 4:
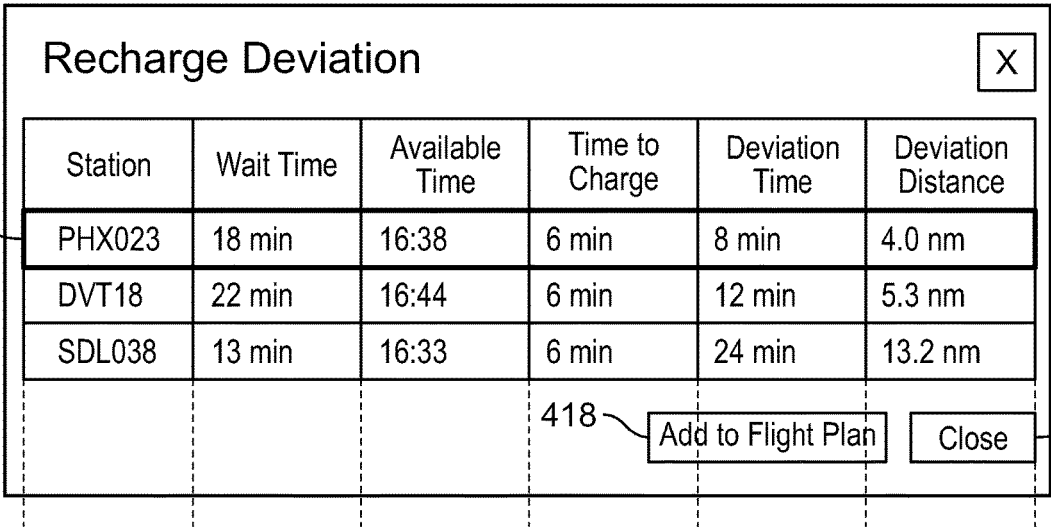
FIGS. 4-5 are tabular views of recharge station information, as may be generated and displayed on the display device of a UAM vehicle, in accordance with an exemplary embodiment of the present disclosure.
Figure 5:
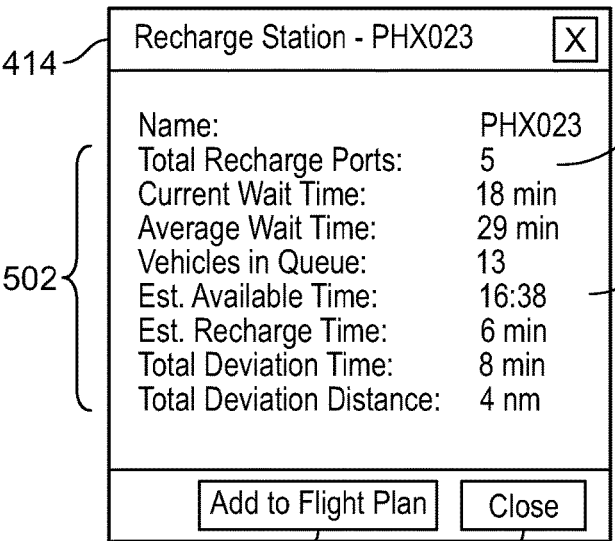

Turning now to FIGS. 4-5, in various embodiments, the controller 12 may prompt the user and respond to various user selections to generate and display various tabular views that assist a user in understanding recharge station options. The controller 12 may reference stored recharge station information and received real-time status updates to generate and display a first tabular view 400, including, for each of the identified recharge stations, information such as, a station name 402, a current wait time 404, a time available 406, an UAM-specific time to charge 408, a path deviation time 410, and a path deviation distance 412. The first tabular view 400 may include a user selectable option to close 416 the tabular view. The controller 12 places the recharge station having the shortest path deviation distance at the top of the table and highlights it PHX023 (414) (shown highlighted with a boundary around the table entry, but other visualization techniques may be employed). The user may add the highlighted recharge station to the flight plan, for example, by selecting a prompt such as GUI button 418.

The user may also open additional tabular information about a selected recharge station. For example, the user could select station PHX023 (414), responsive to which the controller 12 may open a second tabular view 500 showing, only for the selected recharge station 414, recharge station status and information 502. The recharge station status and information 502 may include a total number of recharge ports 508, an average wait time 510, a current wait time, a number of vehicles in queue, the estimated available time, an estimated recharge time, the total deviation time and the total deviation distance. The tabular view second may include a user selectable option to close 506 the second tabular view 500. The second tabular view 500 may also include a user selectable option 504 to add the selected station to the flight plan.

Figure 6:
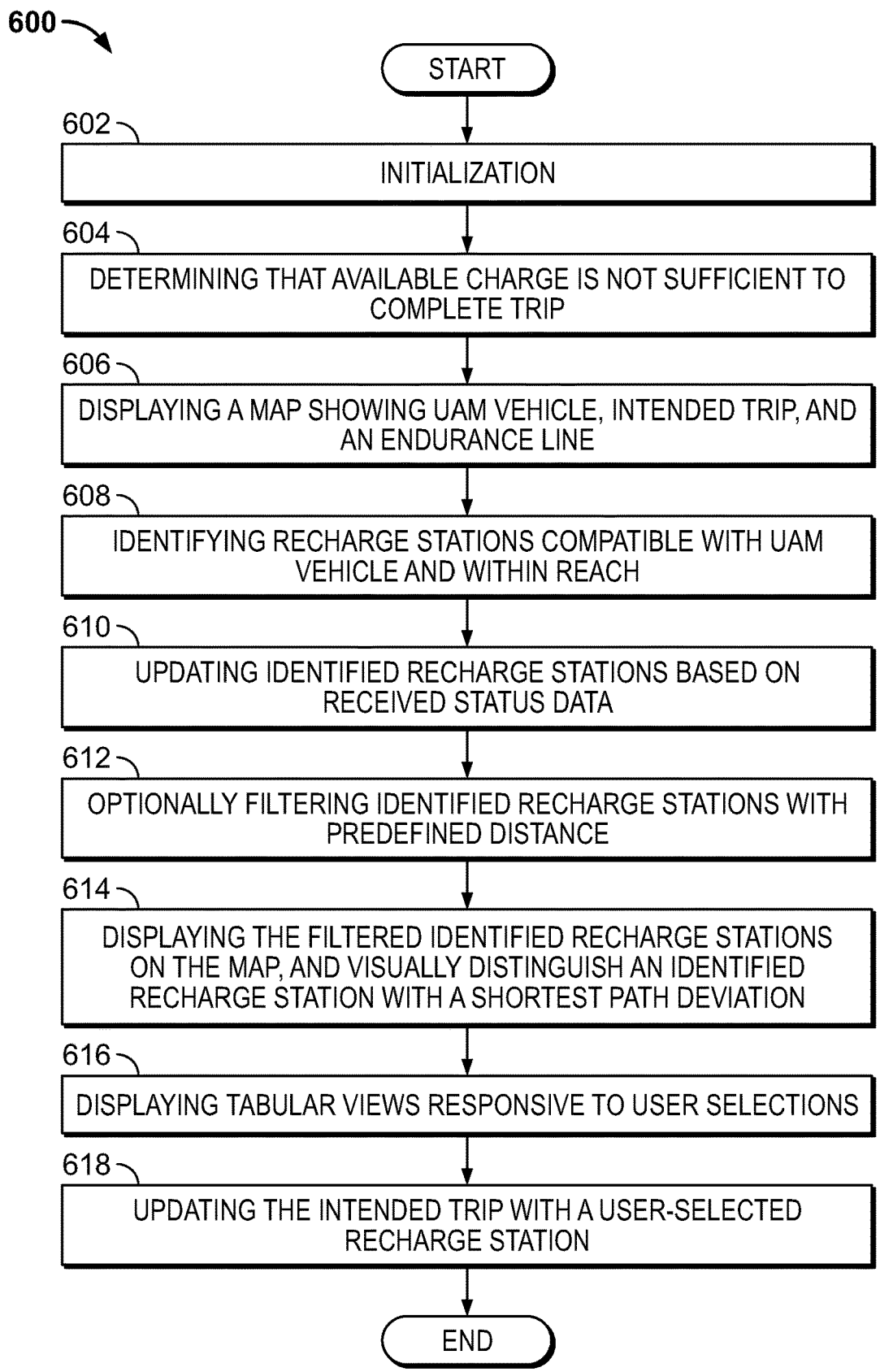
FIG. 6 is a flow chart of a method for displaying off-board recharge station information for UAM vehicle, as may be implemented by the system of FIG. 1, in accordance with an exemplary embodiment of the present disclosure.

Turning now to FIG. 6, the system 10 described above may be implemented by a processor-executable method 600 providing off-board recharge station 36 information for an urban air mobility (UAM) vehicle 5. For illustrative purposes, the following description of method 600 may refer to elements mentioned above in connection with FIG. 1. In practice, portions of method 600 may be performed by different components of the described system. It should be appreciated that method 600 may include any number of additional or alternative tasks, the tasks shown in FIG. 6 need not be performed in the illustrated order, and method 600 may be incorporated into a more comprehensive procedure or method having additional functionality not described in detail herein. Moreover, one or more of the tasks shown in FIG. 6 could be omitted from an embodiment of the method 600 as long as the intended overall functionality remains intact.

At 602, the system 10 is initialized. Initialization may include loading instructions and program 30 into a processor within the controller 12, as well as loading initial recharge station information, map data, and UAM vehicle-specific features into one or more database(s) 28.

At 604, the controller 12 processes data from available ownship data sources 20, the intended trip or flight plan, and determines how far the UAM vehicle can travel on the available charge, and relatedly, whether there is sufficient available charge to complete the intended trip. When there is insufficient available charge to complete the intended trip, the controller displays a map showing the UAM vehicle 5 at its current location, the intended trip, and renders an endurance line on the intended trip to show an estimated distance the UAM vehicle 5 can travel on the available charge (at 606).

At 608, the controller 12 references available recharge station 36 information and identifies recharge stations that are compatible with the UAM vehicle 5 and within reach of the available charge. At 610, responsive to any received real-time status updates on the identified recharge stations, the controller updates its list of identified recharge stations. At 612, the identified recharge stations may be optionally filtered by a predefined distance to enhance the human machine interface by supporting color coding or other intuitive visualization methods to quickly visually convey proximity of recharge stations.

At 614, the identified recharge stations are displayed on the map, and an identified recharge station having a shortest deviation distance is visually distinguished. In embodiments using the predefined distance at 612, a color coding scheme may be used to visually convey which identified recharge stations are within the predefined distance (for example, by rendering their symbols in green) and which identified recharge stations are outside of the predefined distance (for example, by rendering their symbols in red).

At 616, a first tabular view (shown in FIG. 4) and a second tabular view (shown in FIG. 5) may be created and displayed by the controller 12, responsive to user input selections. In some embodiments, the tabular views may be rendered as an overlay on the map, in an area that does not obscure the intended trip or flight plan. In other embodiments, the tabular views may be rendered in a dedicated area on a multi-function display that is different from the map view. At 618, responsive to a user selection, the controller 12 may update the intended trip to include a deviation to a recharge station. After 618, the method 600 may end or return to 604.

Figure 7:
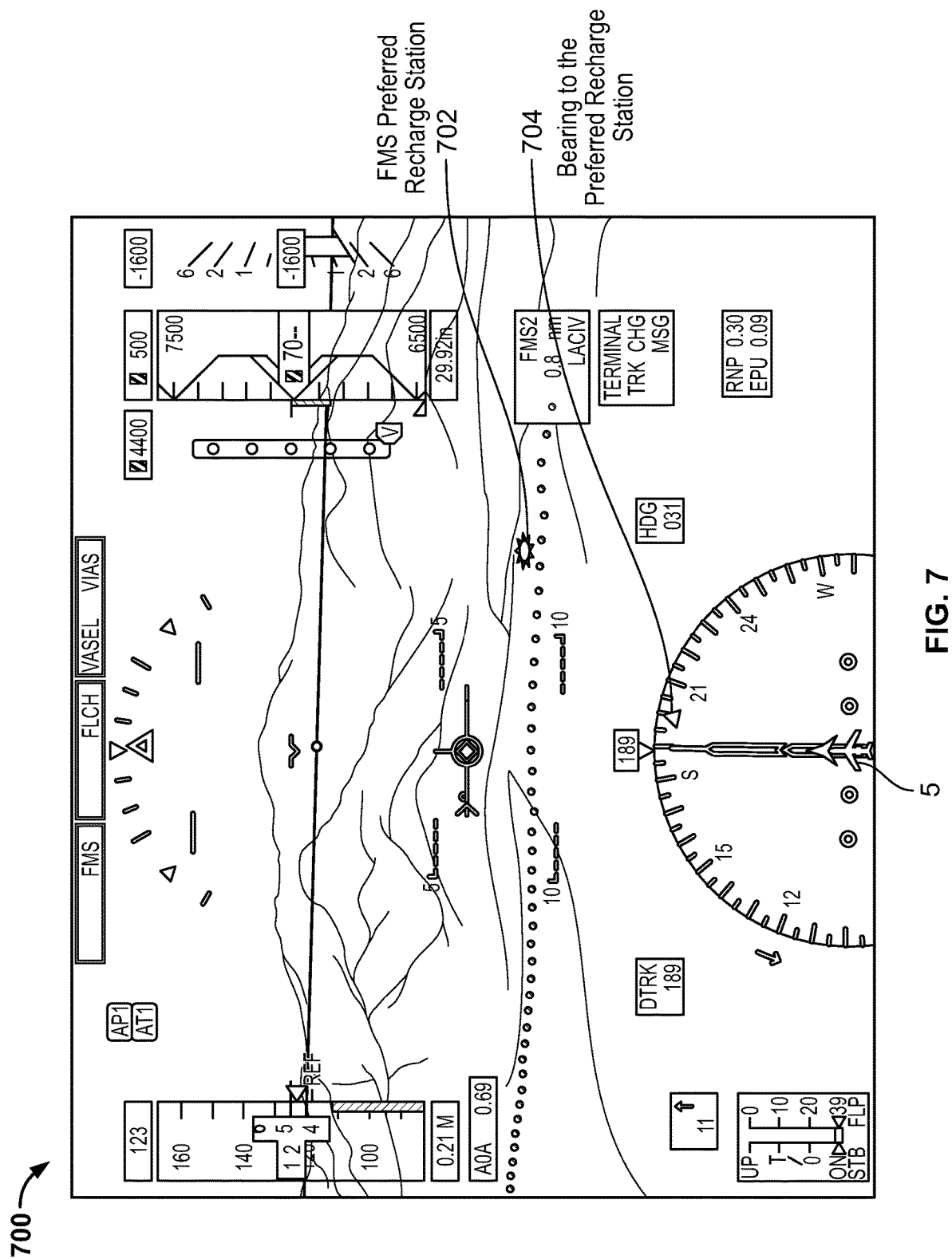
FIG. 7 is an illustration of a primary flight display (PFD) with synthetic vision showing recharge station information, as may be generated and displayed on the display device of a UAM vehicle, in accordance with an exemplary embodiment of the present disclosure.

Turning now to FIG. 7, in various embodiments, the controller 12 may generate and display recharge information for a primary flight display (PFD) 700; in particular, an indicator 702 may be rendered at a location of the recommended recharge station. Additionally, the controller 12 may render a bearing indicator 704, such as a carrot or triangle, on the compass of the PFD 700.

Thus, enhanced systems and methods for providing off-board recharge station information for an urban air mobility (UAM) vehicle are provided. The provided methods and systems provide an objectively improved human-machine interface with map views and interactive tabular views that provide relevant recharge station information. The provided enhanced features allow for a user to plan recharge deviations with confidence that the intended trip is being adhered to as closely as possible.

Although an exemplary embodiment of the present disclosure has been described above in the context of a fully-functioning computer system (e.g., system 10 described above in conjunction with FIG. 1), those skilled in the art will recognize that the mechanisms of the present disclosure are capable of being distributed as a program product (e.g., an Internet-disseminated program or software application) and, further, that the present teachings apply to the program product regardless of the particular type of computer-readable media (e.g., hard drive, memory card, optical disc, etc.) employed to carry-out its distribution.

Terms such as "comprise," "include," "have," and variations thereof are utilized herein to denote non-exclusive inclusions. Such terms may thus be utilized in describing processes, articles, apparatuses, and the like that include one or more named steps or elements but may further include additional unnamed steps or elements. While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. Various changes may be made in the function and arrangement of elements described in an exemplary embodiment without departing from the scope of the invention as set-forth in the appended Claims.

What is claimed is:

1. A system for providing, on a display device, off-board recharge station information for an urban air mobility (UAM) vehicle, the system comprising:
  a data storage disposed on the UAM and storing recharge station information;
  a controller disposed on the UAM and having an on-board processor operationally coupled to the data storage and the display device and configured by programming instructions on non-transient computer readable media to:
  determine that an available UAM charge is not sufficient to complete an intended trip;
  command the display device to display a map showing the UAM at a current location, the intended trip, and an endurance line that represents an extent of the available UAM charge;
  identify recharge stations that are compatible with the UAM, and can be reached from the intended trip with the UAM available charge;
  update information associated with the identified recharge stations responsive to a real-time status update for at least one of the identified recharge stations; and
  command the display device to display the identified recharge stations and to visually depict an identified recharge station having a shortest path deviation from the intended trip, as determined based on the updated identified recharge stations,
  wherein the shortest path deviation includes an outbound path from the intended trip to the identified recharge station and a return path from the identified recharge station to a recapture point on the intended path.

2. The system of claim 1, wherein the controller is integrated with a flight management system (FMS) of the UAM.

3. The system of claim 1, wherein the controller is further configured to:
generate and display a first tabular view of the identified recharge stations, the tabular view including a station name, a current wait time, an UAM-specific time to charge, a path deviation time, and a path deviation distance; and
open a second tabular view showing, for a selected recharge station, recharge station information and recharge station status responsive to receiving a user input selecting the recharge station.

4. The system of claim 3, wherein the data storage of recharge station information includes the station name, a station location, a number of recharge ports at the station, and a compatibility type for each recharge port.

5. The system of claim 4, wherein the real-time status update for the at least one of the identified recharge stations includes a current wait time, and an average wait time.

6. The system of claim 5, wherein the real-time status update from the at least one of the identified recharge stations is wirelessly received via a UAM gateway.

7. The system of claim 3, wherein the controller is further configured to calculate an estimated available time and display the calculated available time in the first tabular view.

8. The system of claim 3, wherein the intended trip is a flight plan, and wherein the controller is further configured to display, in the first tabular view, a prompt for a user to add a recharge station to the flight plan.

9. The system of claim 3, wherein the controller is further configured to render a user-selectable close button on the first tabular view and on the second tabular view.

10. The system of claim 1, wherein the controller is further configured to:
color code recharge stations within a predefined distance from the intended trip a first color; and
color code recharge stations beyond the predefined distance from the intended trip a second color that is distinguishable from the first color.

11. A method for providing on a display device off-board recharge station information for an urban air mobility (UAM) vehicle, the method comprising:
determining, by a controller on-board the UAM vehicle, that an available UAM charge is not sufficient to complete an intended trip;
displaying a map, on the display device, showing the UAM vehicle at a current location, the intended trip, and an endurance line that represents an extent of the available UAM charge;
retrieving, by the controller, recharge station information including the station name, a station location, a number of recharge ports at the station, and a compatibility type for each recharge port;
identifying, by the controller, recharge stations that are compatible with the UAM vehicle, and can be reached from the intended trip with the UAM available charge;
updating, by the controller, information associated with the identified recharge stations responsive to a received real-time status update for at least one of the identified recharge stations;
filtering the identified recharge stations based on a predefined distance; and
commanding the display device to visually depict, on the map, the filtered identified recharge stations, and visually distinguish an identified recharge station having a shortest path deviation from the intended trip, as determined based on the updated identified recharge stations,
wherein the shortest path deviation includes an outbound path from the intended trip to the identified recharge station and a return path from the identified recharge station to a recapture point on the intended path.

12. The method of claim 11, further comprising:
generating and displaying a first tabular view of the identified recharge stations, the tabular view including a station name, a current wait time, an UAM vehicle-specific time to charge, a path deviation time, and a path deviation distance; and
displaying a prompt for a user to add a selected recharge station to the intended trip.

13. The method of claim 12, further comprising:
calculating, by the controller, an estimated available time; and
displaying the estimated available time in the first tabular view.

14. The method of claim 13, wherein the real-time status update for the at least one of the identified recharge stations includes a port closed for repair.

15. The method of claim 14, wherein the real-time status update from the at least one of the identified recharge stations is wirelessly received via a UAM gateway.

16. The method of claim 12, further comprising:
receiving a user input selecting an identified recharge station; and
opening a second tabular view showing, for only the selected recharge station, recharge station information and recharge station status responsive to the user input.

17. The method of claim 11, further comprising:
color coding recharge stations within the predefined distance from the intended trip a first color; and
color coding recharge stations beyond the predefined distance from the intended trip a second color that is distinguishable from the first color.

18. A method for providing on a display device off-board recharge station information for an urban air mobility (UAM) vehicle flying on a flight plan, the method comprising:
determining, by a controller on-board the UAM vehicle, that an available UAM charge is not sufficient to complete an intended trip;
displaying a map, on the display device, showing the UAM vehicle at a current location, the intended trip, and an endurance line that represents an extent of the available UAM charge;
retrieving, by the controller, recharge station information including a station name, a station location, a number of recharge ports at the station, and a compatibility type for each of the number of recharge ports;
identifying, by the controller, recharge stations that are compatible with the UAM vehicle, and can be reached from the intended trip with the UAM available charge;
updating, by the controller, information associated with the identified recharge stations responsive to a received real-time status update for at least one of the identified recharge stations;
filtering the identified recharge stations based on a predefined distance; and
commanding the display device to visually depict the filtered identified recharge stations, an identified recharge station having a shortest path deviation from the intended trip, and the shortest path deviation, as determined based on the updated identified recharge stations, wherein the shortest path deviation includes an outbound path from the intended trip to the identified recharge station and a return path from the identified recharge station to a recapture point on the intended path.

19. The method of claim 18, further comprising:

generating and displaying a first tabular view of the identified recharge stations, the tabular view including a station name, a current wait time, an UAM vehicle-specific time to charge, a path deviation time, and a path deviation distance;

receiving a user input selecting an identified recharge station from the first tabular view; and responsive to the user input, opening a second tabular view showing, for only the selected recharge station, recharge station information and recharge station status.

* * * * *